(12) United States Patent
Hess

(10) Patent No.: US 6,652,628 B1
(45) Date of Patent: Nov. 25, 2003

(54) DIESEL FUEL HEATED DESICCANT REACTIVATION

(76) Inventor: Spencer W. Hess, 1961 Newark Ave., Whiting, NJ (US) 08759

( * ) Notice: Subject to any disclaimer, the term of this patent is extended or adjusted under 35 U.S.C. 154(b) by 0 days.

(21) Appl. No.: 10/190,035

(22) Filed: Jul. 8, 2002

(51) Int. Cl.[7] .......................... B01D 53/06; B01D 53/26
(52) U.S. Cl. ............................ 95/113; 95/115; 95/120; 95/123; 96/125; 96/127; 96/146; 96/150
(58) Field of Search .................... 95/113–115, 120, 95/123, 126; 96/125–128, 130, 146, 150

(56) References Cited

U.S. PATENT DOCUMENTS

| | | | | |
|---|---|---|---|---|
| 2,328,521 A | * | 8/1943 | Wittmann | 96/111 |
| 2,328,974 A | * | 9/1943 | Guler | 96/112 |
| 2,609,060 A | * | 9/1952 | Kearby | 95/14 |
| 2,633,928 A | * | 4/1953 | Chamberlain | 96/111 |
| 3,144,901 A | * | 8/1964 | Meek | 96/144 |
| 3,251,402 A | * | 5/1966 | Glav | 96/125 |
| 3,774,374 A | * | 11/1973 | Dufour et al. | 96/112 |
| 3,844,737 A | * | 10/1974 | Macriss et al. | 95/93 |
| 4,948,392 A | * | 8/1990 | Rush | 95/113 |
| 5,147,420 A | * | 9/1992 | Claesson | 95/113 |
| 5,170,633 A | * | 12/1992 | Kaplan | 62/94 |
| 5,572,799 A | * | 11/1996 | Masuyuki et al. | 34/80 |
| 5,709,736 A | * | 1/1998 | Fujimura | 96/144 |
| 6,027,546 A | * | 2/2000 | Kusters et al. | 95/52 |
| 6,083,300 A | * | 7/2000 | McFadden | 95/113 |
| 6,235,086 B1 | * | 5/2001 | Fujimura | 95/113 |
| 6,294,000 B1 | * | 9/2001 | Klobucar | 95/113 |
| 6,355,091 B1 | * | 3/2002 | Felber et al. | 95/10 |
| 6,361,585 B1 | * | 3/2002 | Anzai et al. | 95/113 |
| 6,406,522 B1 | * | 6/2002 | McFadden et al. | 95/113 |

* cited by examiner

Primary Examiner—Robert H. Spitzer
(74) Attorney, Agent, or Firm—Charles I. Brodsky

(57) ABSTRACT

Desiccants employed in dehumidifying moisturized air present within a water-damaged building are themselves dehumidified to liberate collected moisture through the use of ambient air drawn over and about a heat exchanger fired by diesel fuel.

9 Claims, 2 Drawing Sheets

DIESEL FUEL HEATED DESICCANT REACTIVATION

CROSS-REFERENCE TO RELATED APPLICATIONS

NONE

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to the restoration industry, in general, and to the drying-out of water damaged buildings, in particular.

2. Description of the Related Art

As is known and understood, mobile desiccant dehumidifiers have begun to be employed more and more in recent years to dry water damaged buildings to reduce health problems caused by the incipient mold which develops. As is also known, silica gel is oftentimes employed as the desiccant in a wheel through which the moistened air is pulled from the walls, the flooring, the concrete, etc. into the dehumidifying chamber. As the silica gel, or other desiccant employed, absorbs the moisture, however, it becomes necessary to additionally heat the desiccant to liberate the moisture it collects; this, then, serves to optimize the operation in a continuous cycle—allowing the desiccant to continually absorb the moisture in the building. Where large-scale desiccant equipment is employed, the heat energy, required is typically provided by electric heating or propane heating. However, problems exist with both these methods of reactivating the desiccant.

For example, electric heating requires a large amount of electric power, which many damaged buildings will not have available. Utilizing alternatively provided generators, on the other hand, adds additional expense from their rental, along with an accompanying high fuel bill. Propane fired dehumidifiers, on the other hand, exhibit many disadvantages of their own: a) Special permits are frequently required to transport the propane to the work site by trailer or other vehicle; b) Additional permits are oftentimes required for working with propane at the work site itself; c) A resupply of propane may not be readily available—as when the building being dried is at a remote location, or when a resupply is needed the middle-of-the-night, or on a Sunday; d) Firing the dehumidifier with propane produces a moisturizing effect which undesirably wets the processed air being dried; and e) Propane, itself, is highly flammable.

Still, as the need to reactivate the silica gel or other desiccant continues, dehumidifiers of these types continue to be used—both when carried on the bed of a trailer, or when off-loaded alongside the building.

OBJECTS OF THE INVENTION

It is an object of the present invention, therefore, to provide a new and improved manner of reactivating the desiccant in these de-humidifying apparatus.

It is an object of the invention, also, to provide such a manner of reactivation without adding offsetting limitations of its own.

It is another object of the invention to provide such a manner of reactivation which is readily available to use, and economical in operation.

SUMMARY OF THE INVENTION

As will become clear from the following description, apparatus according to the invention for dehumidifying moisturized air present within a building from a point external thereto includes an enclosure housing a heat exchanger, a desiccant, a first blower drawing ambient air from outside the enclosure over the heat exchanger through the desiccant in a first direction, a second blower drawing the moisturized air from within the building through the desiccant in a second direction, and means for firing the heat exchanger with diesel fuel. As will also be seen, the enclosure, in one embodiment, may rest on a ground surface adjacent to the building in which the moisturized air is present—while, in a second embodiment, the enclosure may rest on a trailer or truck bed on which it is carried to the work site adjacent to the building to be dehumidified. In such instances, the desiccant may include a silica gel composition—for example, in the form of a rotating silica gel wheel. In operation, the ambient air once heated is drawn through the desiccant in a direction opposite to that in which the moisturized air is drawn. The heated ambient air thus serves to liberate the moisture collected by the desiccant, in reactivating it for continuing use.

A method is thus provided for dehumidifying the moisturized air present within the building by providing a dehumidifying chamber including the heat exchanger and the desiccant. Ambient air from outside the building in which the moisturized air is present is drawn over the heat exchanger and through the desiccant in a first direction. The moisturized air present within the building is drawn through the desiccant in a second direction, with the desiccant itself being dehumidified by the ambient air passing over and around the heat exchanger. In accordance with the invention, the method includes the firing of the heat exchanger with diesel fuel. In a preferred embodiment, the dehumidifying chamber provided includes a desiccant of silica gel composition, and in the form of a rotating silica gel wheel.

As will be appreciated by those skilled in the art, the diesel fuel employed in the heating process is available virtually anywhere where diesel trucks serve as a means of transportation. Because diesel fuel provides a greater amount of BTU's per gallon than propane, less fuel is required to provide the heat for the desiccant with diesel fuel than with propane, resulting in a cost savings in use. Also, because the diesel fuel burns without producing moisture, the processed air becomes that much dryer, enabling the reactivation of the desiccant to be accomplished faster, thereby increasing performance in operation. And, because the desiccant dehumidifier of the invention operates more efficiently, its construction allows for a reduction in the required horsepower of the reactivation blower pulling the ambient air over the heat exchanger—resulting in a more compact machine, for easier transportation.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE INVENTION

Figure 1:
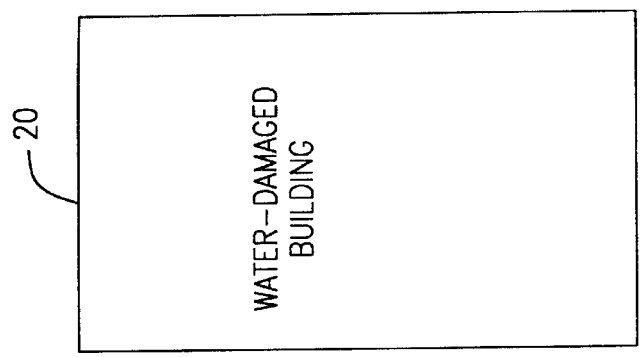
FIG. 1 is a block diagram helpful in an understanding of the apparatus and method for dehumidifying moisturized air present within a building from a point external thereto.
Figure 1:
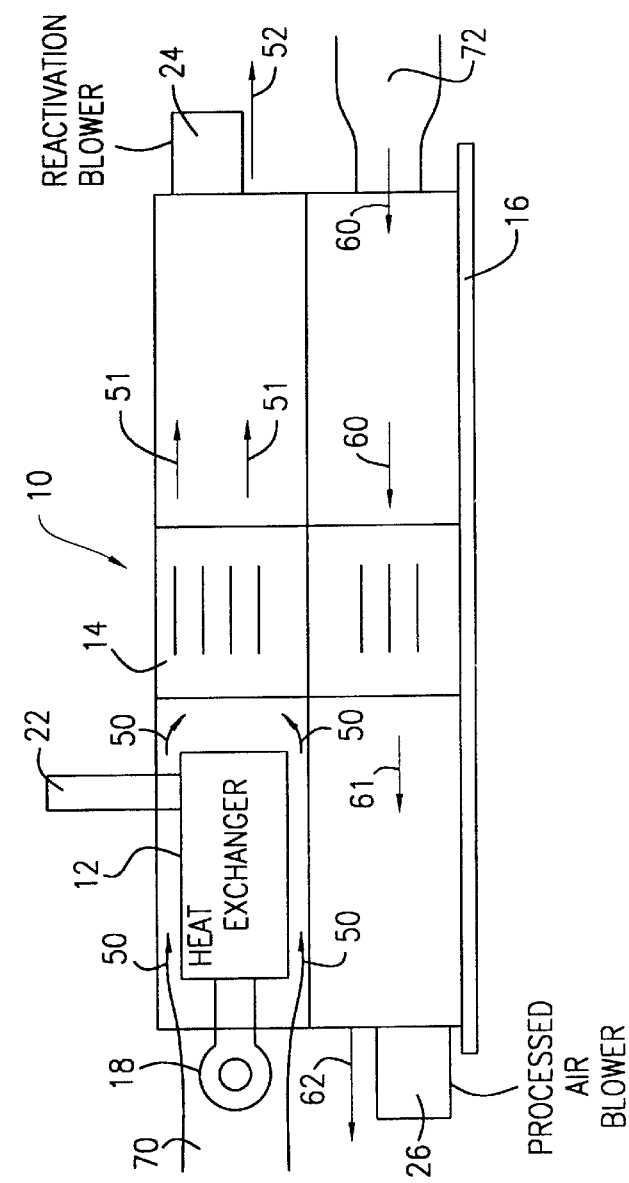
Figure 2:
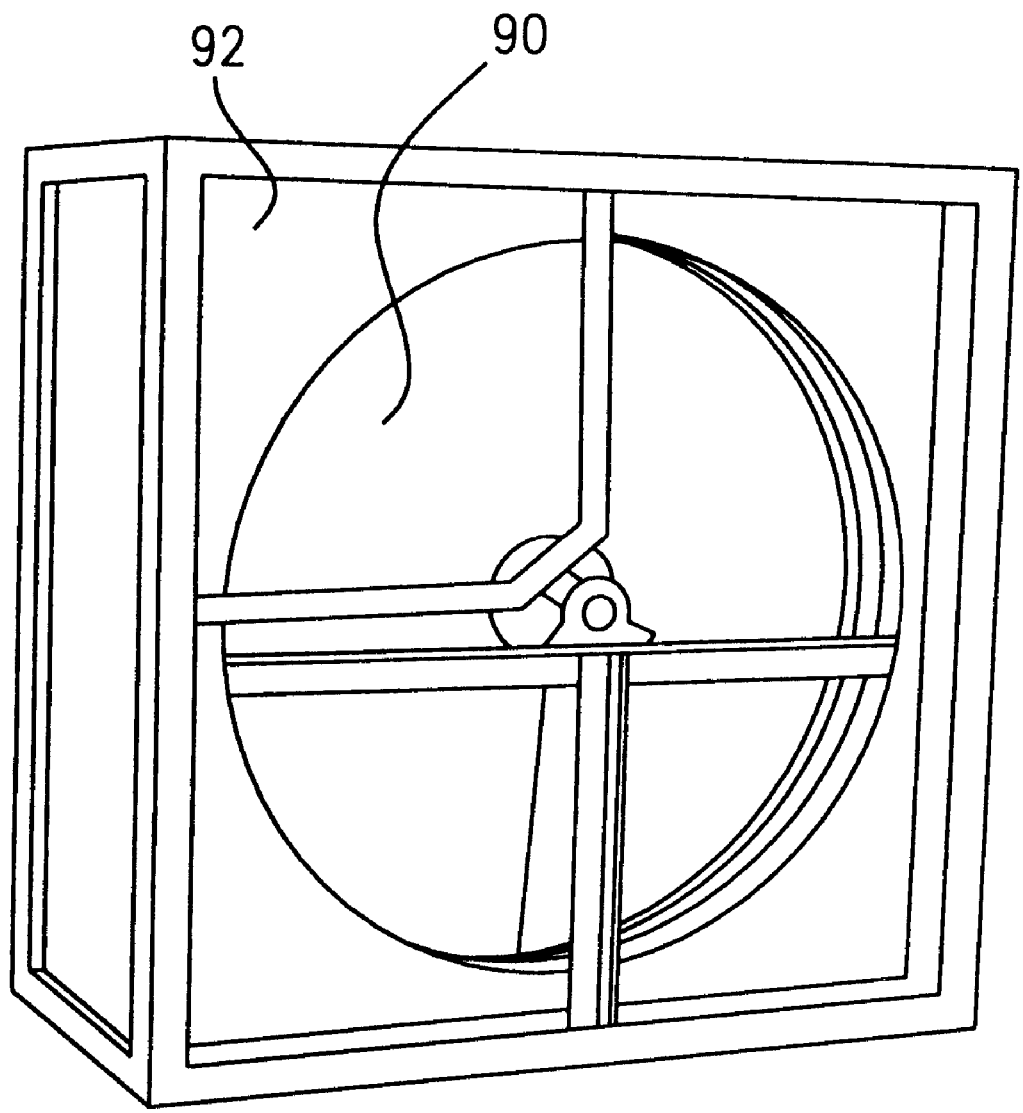
FIG. 2 illustrates a preferred construction of the desiccant employed.

Referring to FIGS. 1 and 2, the desiccant reactivation apparatus of the invention and its method of operation both follow from the use of an enclosure 10 having a heat exchanger 12 and a desiccant 14. Reference numeral 20 identifies a building in which moisturized air is present which the apparatus of the invention is to dehumidify, with the enclosure 10 having a bottom surface 16 which may rest upon a trailer or truck bed adjacent the building 20 once driven to the work site. Alternatively, the enclosure 10 could be off-loaded from the trailer or truck bed onto the ground itself. Reference numeral indicates a diesel fuel burner according to the invention, having an exhaust gas stack 22. As will be understood, the diesel fuel burner 18 heats the exchanger 12 from the inside out.

A first, or reactivation, blower 24 draws ambient air from the surrounds via 18 inch ductwork 70, for example, into the enclosure 10, over and about the diesel fired heat exchanger 12 and through the desiccant 14 in a first direction, as illustrated by the arrows 50; the moisture liberated, heated air through the desiccant 14 is discharged outside the enclosure 10 as shown by the arrows 51–52. A second, or processed air, blower 26 draws the moisturized air from within the building through like ductwork 72 and the desiccant 14 in a second direction (shown by the arrows 60), which traps the moisture therein before discharging the dried air out the enclosure 10 as shown by the arrows 61–62. The diesel fired heat exchanger 12 thus dehumidifies the desiccant 14 of the moisture collected from the wet building air in reactivating the desiccant 14 for continuing use. As previously noted, the diesel fuel is readily available, clean burning, and efficient in operation. And, as a result, the desiccant dehumidifying apparatus can be rented out for use at a lowered cost, reducing the expenses in restoring water damaged buildings to their original conditions.

In the embodiment depicted in FIG. 1, the ambient air from outside the enclosure 10 is shown as being drawn through the desiccant 14 in a direction opposite to that in which the moisturized air is pulled from the building through the desiccant 14. In such manner of use, a desiccant 14 including a silica gel composition is particularly attractive in collecting the moisture from the water-damaged building's air. FIG. 2 illustrates the desiccant 14 as being in the form of a rotating silica gel wheel 90 in a frame 92 within the enclosure 10. Because the apparatus employing the diesel fuel firing is of increased efficiency, the horsepower requirements of the reactivation blower 24 pulling the ambient air is significantly reduced, in allowing the enclosure 10 to be of lesser size. The enclosure could then be permanently mounted on a trailer and brought to the work site mobilized for use.

The method of employing the invention then follows—either with a desiccant of silica gel composition, or in the form of a rotating wheel, or otherwise—simply by providing the dehumidifying chamber with the heat exchanger and the desiccant, drawing the ambient air from outside the building over and about the heat exchanger through the desiccant in a first direction, and drawing the moisturized air out from the building through the desiccant in a second direction—all the while firing the heat exchanger with the diesel fuel. As with the described apparatus, an improved environmental drawing results, quickly, simply and efficiently, thereby reducing the severe health and/or carcinogenic problems associated with water damaged buildings.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the invention.

I claim:

1. A method for dehumidifying moisturized air present within a building from a point external thereto comprising the steps of:

providing a dehumidifying chamber including a heat exchanger and a desiccant;

drawing ambient air from outside the building over said heat exchanger and through said desiccant in a first direction;

drawing moisturized air from within the building through said desiccant in a second direction; and firing said heat exchanger with diesel fuel.

2. The method of claim 1 wherein said desiccant includes a silica gel composition.

3. The method of claim 1 wherein said desiccant includes a rotating silica gel wheel.

4. Apparatus for dehumidifying moisturized air present within a building from a point external thereto comprising: an enclosure housing a heat exchanger, a desiccant, a first blower drawing ambient air from outside said enclosure over said heat exchanger through said desiccant in a first direction, a second blower drawing said moisturized air through said desiccant in a second direction, and means for firing said heat exchanger with diesel fuel.

5. The apparatus of claim 4 wherein said enclosures rests on a ground surface adjacent said building in which said moisturized air is present.

6. The apparatus of claim 4 wherein said enclosure rests on a trailer or truck bed adjacent said building in which said moisturized air is present.

7. The apparatus of claim 4 wherein said desiccant includes a silica gel composition.

8. The apparatus of claim 4 wherein said desiccant includes a rotating silica gel wheel.

9. The apparatus of claim 4 wherein said first and second blowers draw said ambient air and said moisturized air through said desiccant in opposite directions.

* * * * *